United States Patent

[11] 3,569,634

[72] Inventors Claudio Amadasi
via Asellia, Milan;
Adriano Maj, via Mazzucchelli 3,
Morazzone, Italy

[21] Appl. No. 738,172
[22] Filed June 19, 1968
[45] Patented Mar. 9, 1971
[32] Priority June 27, 1967
[33] Italy
[31] 52244A/67

[54] BLOCKING CIRCUIT FOR TELEPHONE APPARATUS
5 Claims, 3 Drawing Figs.

[52] U.S. Cl. .......... 179/18
[51] Int. Cl. .......... H04m 3/38
[50] Field of Search .......... 179/18.2, (18DA)

[56] References Cited

UNITED STATES PATENTS 2,897,277 7/1959 Schmidt .......... 179/18(.2)
2,914,616 11/1959 Lomax .......... 179/18(.2)

*Primary Examiner*—Kathleen H. Claffy
*Assistant Examiner*—Thomas W. Brown
*Attorney*—Clario Ceccon

ABSTRACT: A telephone circuit which prevents unauthorized long-distance calls by disconnecting the line with the telephone exchange by means of a pulse counter and a series switch combination operating in response to the pulses given by the first dialed number.

BLOCKING CIRCUIT FOR TELEPHONE APPARATUS

The present invention relates to a block circuit for trunk calls for use with telephone exchange or private telephone apparatus.

It is known that with automatic telephone apparatus the desired number is transmitted to the exchange by means of a dial which causes interruptions of the direct current passing through the telephone line when the handset receiver is raised. The interruptions have a cycle of about 100 milliseconds and the pulse set forming a numeral is spaced from the subsequent by at least 200 or 300 msec.

The number of interruptions is equal to the selected numeral, except for the numeral 0 for which the corresponding interruptions are 10.

It is also known that the trunk calls effected through direct dialing or the calls directed to particular services, such as, for example, time and radio news services, are automatically charged to the account of the user by a corresponding number of counter trippings.

Therefore, the problem arises in preventing the use of telephone apparatus, intended for internal calls or normal calls, for long distance calls without the apparatus subscriber's consent.

The present invention solves the above-mentioned problem by means of a special circuit which blocks the telephone apparatus when the number dialed corresponds to a trunk call or a taxed service, but allows the normal operation for internal or normal calls.

This is made possible by the fact that, in trunk calls, the telephone number of the station called is preceded by a prefix having 0 or 9 as the first numeral, and that in service calls the first numeral is always 1,whereas in normal calls there is used as the first numeral any one of the remaining numerals, that is from 2 to 8.

The circuit blocking device according to the invention comprises essentially a counter capable of effecting the count of pulses corresponding to the first numeral selected on the dial, and a series switch connected to the telephone line and controlled by the counter. Said switch, when opening, interrupts the connection between the telephone apparatus and the exchange.

If the outgoing communication is a trunk call or one concerning any of the special taxed services, the pulses corresponding to the first numeral are respectively 9 or 10 or 1: in this case, the counter causes the series switch to open and interrupt the connection with the telephone exchange.

For a better understanding of the invention reference is made to the accompanying drawings which show by way of example a preferred embodiment of the invention, and in which.

Figure 1:
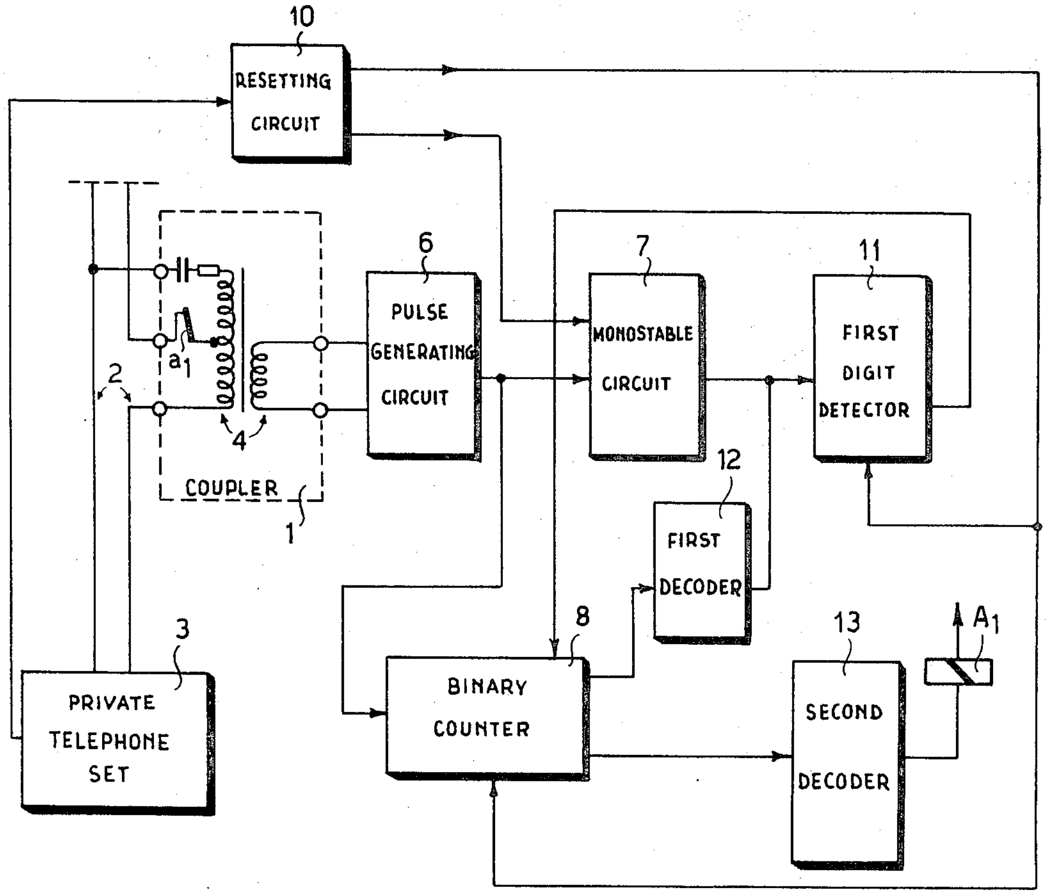
FIG. 1 is a block diagram of the blocking circuit according to the invention.

Referring now to FIG. 1, the blocking device of the invention comprises a coupler 1 connected to the telephone line 2 which connects an individual telephone apparatus or a private exchange 3 to a telephone exchange (not shown).

The coupler 1 is formed by a balanced transformer 4 and a series switch $a_1$ connected to the primary of the transformer. The secondary of said transformer 4 feeds a pulse-generating circuit 6 capable of reconstituting the shape of the pulses present on line 2. Circuit 6 connects with both a binary counter 8 and a numeral monostable circuit 7 which is also fed by a resetting circuit 10 connected to the telephone apparatus 3.

The monostable circuit 7 output is connected to a first numeral detecting circuit 11 which is also checked by the resetting circuit 10 and which, in turn, conditions the binary counter 8.

Said counter 8 is connected to resetting circuit 10 and is decoded by both a first decoder 12 capable of detecting the presence of the zero value on the counter, the output of which is connected to the first numeral detecting circuit 11, and by a second decoder 13 capable of detecting the presence of the 9 or 10 or 1 values on the counter, the output of which feeds relay $A_1$ which controls series switch $a_1$.

Figure 2:
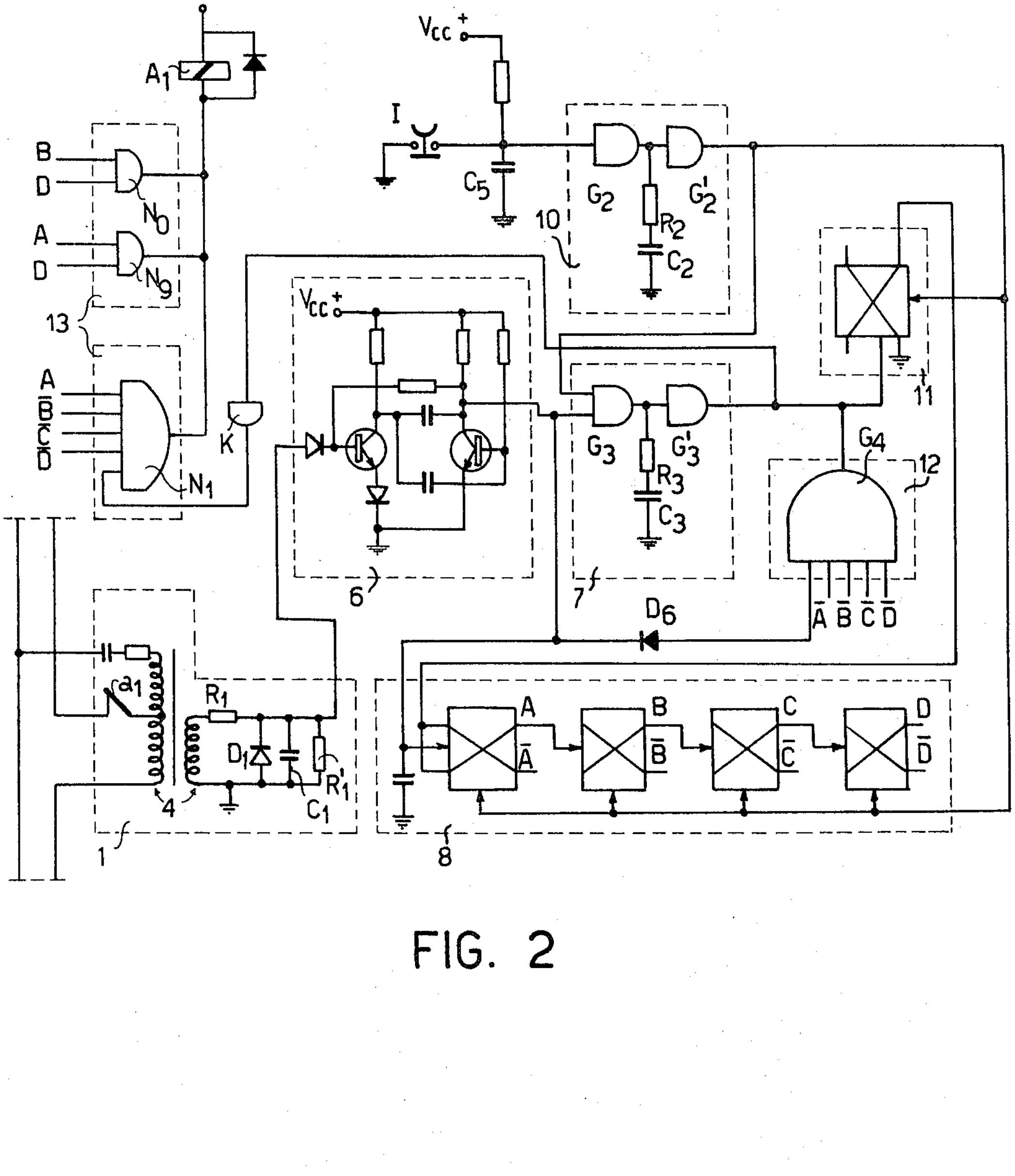
FIG. 2 is a diagram showing in greater detail the circuit of FIG. 1.

Observing now FIG. 2, coupler 1 comprises a series switch $a_1$ connected to telephone line 2 and to balanced transformer 4, the primary winding of which is connected, by way of the telephone impedance and balancing impedance, to the line, while the secondary winding is connected to the pulse-shaping circuit 6 through a unit group composed of series resistance $R_1$ connected to diode $D_1$, capacitance $C_1$ and resistance $R'_1$ connected in parallel to each other and to a ground terminal which form a filter circuit.

The pulse-shaping circuit 6 comprises a multivibrator of known type capable of regenerating the shape of the pulses originating from the line.

The monostable circuit 7 is composed of a first gating circuit $G_3$, to the output terminal of which there are connected in series resistance $R_3$ and capacitance $C_3$, and which circuit is connected to the input terminal of a second gating circuit $G'_3$ connected to the first numeral detecting circuit 11.

Binary counter 8 comprises four flip-flops which are connected in cascade fashion and which permit the count of 16 pulses.

The outputs $\overline{A}$, $\overline{B}$, $\overline{C}$, $\overline{D}$ of counter 8 enable decoder 12, which comprises an AND gate $G_4$, to feed the first numeral detecting circuit 11.

A fifth input of circuit 12 is connected to the output terminal of pulse-shaping circuit 6 through a diode $D_6$.

The output terminals A, B, $\overline{B}$, $\overline{C}$, D, $\overline{D}$ of counter 8 are connected, by leads not represented in the figure, to the detecting decoder 13. The values, A, B, C, D represent powers of 2 such that A represents $2^0$; B represents $2^1$; etc. The value of 10 is represented by BD, or the presence of $2^2$ and $2^4$. The numeral nine is represented by AD, or $2^0$and 24 The numeral one is represented by A. However, the presence of A or $2^0$occurs in the numerals 1, 3, 5, 7 and 9. Accordingly, to ensure that the value is one, the absence of the other values, $\overline{B}$, $\overline{C}$, $\overline{D}$ is also required. Furthermore, under normal operating conditions, all the values are $\overline{A}$ $\overline{B}$ $\overline{C}$ $\overline{D}$. The only difference between normal operation and the presence of a one, is the change in the digit A. To ensure that the value is one and not just an error signal, the output from the monostable circuit 7 is also required. This output is passed through the inverter K before being applied to the decoder 13.

Decoder 13 is formed by three logical gates $N_1$, $N_9$ and $N_0$ of N-AND type, the output terminals of which are connected to one another and to relay $A_1$.

The first numeral detecting circuit 11 is formed by a flip-flop which switches in correspondence with the changes of circuit 7 from logic level 1 to logic level 0, and which remains in that position until it receives a resetting signal from resetting circuit 10. Its output voltage is fed to "set" and "clear" inputs of the first counter 8 flip-flop.

Said flip-flop, when the 0 level is present at its output, prevents the switching of the first counter 8 flip-flop and hence blocks the operation of counter. If level 1 is instead present at its output, the counter may operate unimpeded.

The resetting circuit 10 is composed of a gating circuit $G_2$, the output terminal of which is connected to the input terminal of a second gating circuit $G'_2$ designed to reset the counter 8 flip-flops, the first numeral detecting flip-flop 11 and to provide a signal to gating circuit $G_3$.

A group unit composed of resistance $R_2$ and capacitance $C_2$ connected in series to each other, is connected between circuit $G_2$ and ground.

The blocking device of the invention further comprises a circuit composed of resistance $R_5$, interposed between the feed source $V_{cc}$ and the input terminal of resetting circuit 10, capacitance $C_5$, located between said input terminal of circuit 10 and ground, and contact 1, available inside the telephone exchange or within the telephone apparatus 3, the circuit being open when the user depresses the receiver cradle to hang the handset receiver.

Figure 3:
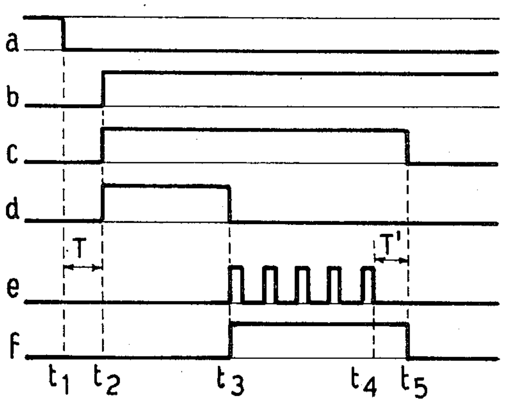
FIG. 3 shows the wave pattern existing at some points in the circuit of FIG. 2.

FIG. 3 shows some diagrams wherein the voltage is plotted as a function of time. Observing the figure, it can be noted that: curves *a*and *b*represent the voltage wave pattern at the input and output of the resetting circuit 10, respectively; curve *c* shows the voltage present at the output of the first numeral detecting circuit 11; curve *d* is the voltage at the output of decoder 12; curve *e* is the output of block 6 regenerating the pulse shape of the numeral; and curve *f* is the output of the monostable circuit 7.

The operation of the blocking circuit according to the invention is as follows:

The telephone user when effecting a call, removes the handset and then rotates the dial which, during its counterclockwise rotation, causes the interruptions of the direct current passing through the telephone line 2.

The lifting of the handset receiver causes contact 1 to close; and consequently the input terminal of circuit 10 is connected to ground.

The voltage present at the input terminal of circuit 10, as indicated by curve *a* in FIG. 3, changes at a given time $t_1$ from a positive value to zero value.

Circuit 10 delays the voltage positive edge by a time delay T depending on the values of its internal resistance and capacitance $C_2$.

Circuit 10 provides an output, as indicated by curve *b* in FIG. 3, initially a null voltage, which changes to a positive value at time $t_2$ following $t_1$ with a certain time delay T, as for example, a delay of 200 msec.

Said delay T is in any event smaller than the time required by the telephone user to rotate the dial, so that the switching of circuit 10 precedes the moment of line current interruption, at time $t_3$.

The output voltage of circuit 10 acts as a resetting signal for the counter 8, the first numeral detecting circuit 11 and the circuit 7 and hence resets to zero the indication of all of the counter 8 flip-flops. It shifts to a positive value the output voltage of the first numeral detecting flip-flop 11, which prior to time $t_2$ was at the 0 level, and provides to gate $G_3$ of circuit 7 the enabling state for the signals from regenerator 6 to pass through said circuit.

The change from level 0 to level 1 of the first numeral detecting flip-flop 11 enables counter 8, which was delayed, to count the signal from the regenerator 6.

Similarly, the reset of counter 8 flip-flops shifts at time $t_2$ to a positive level, the output voltage from the decoder 12 indicating that the counter is reset to zero.

In this way, when at a subsequent time, indicated by $t_3$, the return movement of the dial causes interruption in the line current with respect to the first numeral selected, the blocking circuit is reset to zero and is again in operating condition.

The current interruptions are transferred by means of transformer 4 to the input terminal of the regenerating circuit 6.

The unit group composed of resistance $R'_1$ and capacitance $C_1$ serves as a line noise-filtering means.

The pulse-shaping circuit 6 regenerates the shape of pulses applied thereto, that is, it repeats at its output the pulses originated from the secondary winding of transformer 4, giving them the most suitable shape for a good operation of the numeral detecting circuit and of counter 8.

The "cleaned" pulses at the output of the shaping circuit 6, as shown by curve *e* in FIG. 3, are supplied both to the counter 8 and to the circuit 7 which, having been enabled by reset circuit 10, provides an output voltage, indicated by curve *f* in FIG. 3, which in turn takes a positive level at time $t_3$ when the first pulse presents itself, and returns to the zero level at time $t_5$ following by a delay T' the trailing edge of the last pulse, at time $t_4$.

The return to the 0 level of circuit 7 causes, at time $t_5$, the switching of the first numeral detecting flip-flop 11 which goes to level 0 and interrupts the operation of counter 8.

Said output voltage of circuit 7, at time $t_3$, when the output voltage of decoder 12 drops to level zero due to the switching of the first flip-flop of counter 8, replaces the voltage of the decoder 12 in maintaining the flip-flop 11 output to level 1.

When at time $t_5$ the circuit 7 returns to level 0, the first numeral detecting flip-flop 11 switches and goes to level 0, interrupting the operation of counter 8.

Decoder 13 analyzes the value on the counter 8 corresponding to the number of interruptions effected by the dial and, if that number is 9 or 10 or 1, it generates in a known manner a signal which actuates relay $A_1$, which in turn opens the switch $a_1$ series connected to the telephone line, interrupting the connection with the telephone exchange.

If, instead, the number is other than 9, 10 or 1, the switch $a_1$ remains closed and the connection with the telephone exchange is maintained.

Obviously, the apparatus does not block numerals 0, 1, 9 when they are not in first position, nor does it add the second numeral to the first, thus giving a total of 9 or 1 or 0.

These errors do not occur because block 11, after the first numeral, has brought its output to zero, and this zero voltage, when applied to the input terminal of the counter first flip-flop, avoids the entry of further pulses.

When the receiver is returned to its cradle, the relay $A_1$ closes again and the telephone apparatus returns in its initial condition. Therefore, if the user has dialed a combination number beginning with number 1 or 9 or 0, it is sufficient, to effect a call, to hang again for a moment the receiver or to depress its cradle, in a manner similar to that required to free the line at the end of a communication.

We claim:

1. A blocking circuit for telephone calls between an individual telephone apparatus and a telephone exchange comprising a counter for effecting the count of electric pulses corresponding to the first numeral selected on the dial of said telephone apparatus, and a relay including a switch and an energizing coil, said switch connected in series to the telephone line, which when open interrupts the connection between the individual telephone apparatus and the telephone exchange, and the energizing coil electrically connected to the output of said counter such that when the counter counts a predetermined number of pulses it produces an output voltage which energizes said coil thereby causing said switch to open, and when the telephone receiver of said telephone apparatus is returned to its cradle said voltage is removed from said coil thereby deenergizing said coil causing such switch to close.

2. The blocking circuit according to claim 1, which further comprises a first circuit for detecting the first numeral selected on the telephone dial and blocking said counter immediately after receiving the last electric pulse corresponding to said first numeral; a second circuit for resetting said counter to zero when the telephone receiver is released; a third circuit for detecting the reset of said counter and for generating a consent signal to said first circuit; a fourth circuit for detecting the arrival of digital information pulses and for prolonging said consent signal until the last pulse of said first numeral has been received; and a fifth circuit for decoding on said counter the numerals 1, 9 and 10 and in response to decoding such numerals activating a relay for the interruption of current in the telephone line.

3. The blocking circuit according to claim 1, wherein said counter is a binary counter and comprises four flip-flops in cascade relationship with one another and connected to a single reset conductor.

4. The blocking circuit according to claim 2, wherein a balanced transformer, a noise filtering circuit and a sixth circuit for reshaping the pulses produced by the telephone dial and present at the transformer output, are sequentially interposed between the telephone line and said fourth circuit.

5. The blocking circuit according to claim 2, wherein said fifth circuit is composed of logical circuits of N-AND type and having outputs which actuate a relay for the interruption of the telephone line.